US008031785B2

(12) United States Patent
Mo et al.

(10) Patent No.: US 8,031,785 B2
(45) Date of Patent: Oct. 4, 2011

(54) TRANSMISSION METHODS AND APPARATUS IN MULTI-BAND OFDM WIDEBAND SYSTEMS

(75) Inventors: Shaomin Samuel Mo, Monmouth Junction, NJ (US); Alexander D. Gelman, Smallwood, NY (US)

(73) Assignee: Panasonic Corporation, Osaka (JP)

( * ) Notice: Subject to any disclaimer, the term of this patent is extended or adjusted under 35 U.S.C. 154(b) by 836 days.

(21) Appl. No.: 11/791,872

(22) PCT Filed: Nov. 10, 2005

(86) PCT No.: PCT/US2005/041164
§ 371 (c)(1),
(2), (4) Date: Nov. 26, 2007

(87) PCT Pub. No.: WO2006/060153
PCT Pub. Date: Jun. 8, 2006

(65) Prior Publication Data
US 2008/0212695 A1 Sep. 4, 2008

(51) Int. Cl.
*H04L 27/28* (2006.01)
(52) U.S. Cl. ........ 375/260; 375/261; 375/146; 375/267; 375/272; 375/299; 370/355; 370/430; 370/389; 370/208
(58) Field of Classification Search .................. 375/260, 375/261, 146, 267, 272, 299; 370/355, 430, 370/389, 208
See application file for complete search history.

(56) References Cited

U.S. PATENT DOCUMENTS

| 5,640,415 A | 6/1997 | Pandula et al. | |
|---|---|---|---|
| 7,512,185 B2 * | 3/2009 | Sharon et al. ................. | 375/260 |
| 7,535,819 B1 * | 5/2009 | Larsson et al. ................ | 370/208 |
| 7,653,141 B2 * | 1/2010 | Mo et al. ....................... | 375/260 |
| 2002/0172213 A1 * | 11/2002 | Laroia et al. .................. | 370/430 |
| 2003/0072285 A1 * | 4/2003 | Onggosanusi et al. ....... | 370/335 |
| 2003/0120990 A1 * | 6/2003 | Elbwart et al. ................ | 714/748 |
| 2004/0032354 A1 | 2/2004 | Knobel et al. | |
| 2004/0177306 A1 * | 9/2004 | Hiraki ............................ | 714/748 |
| 2005/0047517 A1 * | 3/2005 | Georgios et al. .............. | 375/267 |
| 2005/0063378 A1 * | 3/2005 | Kadous ......................... | 370/389 |
| 2005/0193307 A1 * | 9/2005 | Wengerter et al. ............ | 714/749 |

FOREIGN PATENT DOCUMENTS

| WO | WO2004/036818 | * 4/2004 |
|---|---|---|
| WO | WO 2005/074154 A | 8/2005 |

OTHER PUBLICATIONS

Falahati S et al., Hybrid Type-II ARQ Schemes With Adaptive Modulation Systems for Wireless Channels, Vic 1999-Fall. IEEE VTS $50^{th}$. Vehicular Technology Conference. Gateway to the $21^{st}$. Century Communications Village. Amsterdam, Sep. 19-22, 1999. IEEE Vehicular Technology Conference, New York, NY : IEEE, US, vol. 5 Conf. 50, Sep. 19, 1999, pp. 2691-2695, XP000922245.
International Search Report dated Mar. 15, 2006.

* cited by examiner

*Primary Examiner* — Kenneth Lam
(74) *Attorney, Agent, or Firm* — RatnerPrestia (57) ABSTRACT

Methods and apparatus for use in a multi-band OFDM wideband transmission systems are disclosed. A frame of source data is mapped by a transmitter for transmission using a first mapping. The frame of source data is then mapped by the transmitter for retransmission using a second mapping to increase frequency diversity. A receiver may identify source data that experiences fading and communicate the tone/frequency on which the fading occurred to the transmitter so that the transmitter may map the source data that experienced fading during transmission to another tone/frequency for retransmission.

16 Claims, 5 Drawing Sheets

TRANSMISSION METHODS AND APPARATUS IN MULTI-BAND OFDM WIDEBAND SYSTEMS

FIELD OF THE INVENTION

The present invention relates to the field of wireless communication and, more particularly, to enhanced communication systems with improved symbol spreading to improve frequency diversity.

BACKGROUND OF THE INVENTION

Wireless personal area networks (WPANs) provide wireless short-range connectivity for electronic devices such as audio/video devices within a home. The Institute of Electrical and Electronics Engineers (IEEE) 802.15 High Rate Alternative PHY Task Group (TG3a) for WPAN is working to develop a higher speed physical (PHY) layer enhancement to IEEE proposed standard P802.15.3™—Draft Standard for Telecommunications and Information Exchange Between Systems (referred to herein as the proposed IEEE standard). Multi-Band Orthogonal Frequency Division Multiplexing (MB-OFDM) has been proposed for the IEEE standard due to its spectrally efficiency, inherent robustness against narrowband interference, and robustness to multi-path fading, which allows a receiver to capture multi-path energy more efficiently.

Figure 1:
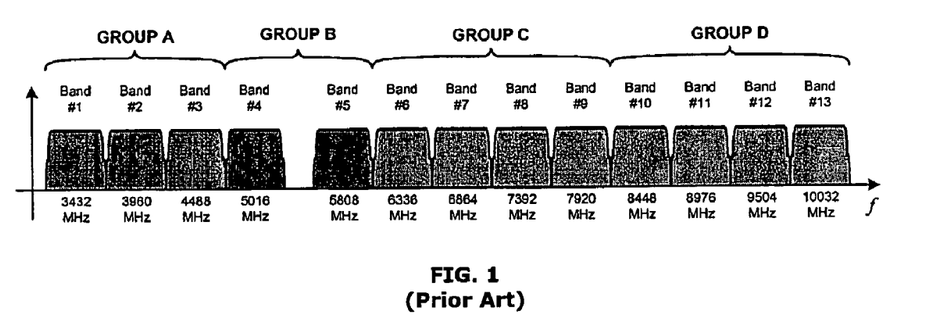
FIG. 1 is a graph of a prior art MB-OFDM frequency spectrum.

FIG. 1 illustrates the MB-UWB frequency spectrum. In MB-UWB, the UWB frequency spectrum, which covers 7.5 GHz in the 3.1 GHz to 10.6 GHz frequency band, is divided into 13 bands, which each occupy 528 MHz of bandwidth. Each band includes 128 sub-carriers of 4 MHz bandwidth. Information is transmitted using OFDM modulation on each band. MB-UWB may be coded such that information bits are interleaved across various bands to exploit frequency diversity and provide robustness against multi-path interference. MB-OFDM, however, does not offer sufficient frequency diversity for higher code rates. Typical techniques to increase frequency diversity in MB-OFDM systems often have a relatively high level of complexity, which adds to the cost of implementing such techniques.

SUMMARY OF THE INVENTION

The present invention is embodied in methods, apparatus, and computer program products for transmission of data in multi-band OFDM wideband systems. In accordance with the present invention, a frame of source data is mapped by a transmitter for transmission using a first mapping. The frame of source data is then mapped by the transmitter for retransmission using a second mapping to increase frequency diversity. A receiver may identify source data that experiences fading and communicate the tone/frequency on which the fading occurred to the transmitter so that the transmitter may map the source data that experienced fading during transmission to another tone/frequency for retransmission.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. The letter "n" may represent a non-specific number of elements. Included in the drawings are the following figures.

DETAILED DESCRIPTION OF THE INVENTION

The present invention is described with reference to the Open Systems Interconnection (OSI) reference model to facilitate description. The OSI reference model sets forth layers present in electronic devices, such as a WPAN compatible electronic devices, to process messages communicated over a network. The OSI reference model includes a physical (PHY) layer, a data-link layer, a network layer, a transport layer, a session layer, a presentation layer, and an application layer. A message originating at a first electronic device for delivery to a second electronic device passes from the application layer of the first electronic device through each layer to the PHY layer, which communicates the message over the network, i.e., a wireless network in a WPAN system. The second electronic device receives the message through its PHY layer and the message is processed through each layer of the second electronic device to retrieve the message from the first electronic device. The data-link layer includes a media access control (MAC) layer and a logical link control layer.

In an exemplary embodiment, the present invention may be implemented as an enhancement to communication systems in accordance with the proposed IEEE standard. The proposed IEEE standard uses a hybrid automatic repeat request (HARQ) scheme to deal with unreliable channel conditions. The HARQ scheme employs a conventional automatic repeat request (ARQ) scheme together with a forward error correction (FEC) technique. If an error is detected, e.g., through a cyclic redundancy check (CRC), the receiving electronic device (herein receiver) requests that the transmitting electronic device (herein transmitter) resend the erroneously received data packets.

Receivers may send acknowledgement messages to transmitters to indicate whether received frames are correctly received and/or demodulated. Acknowledgment type is a function of the MAC layer. There are three acknowledgement types defined for a MB-OFDM MAC layer: no acknowledgment (no-ACK), immediate acknowledgement (Imm-ACK), and delayed acknowledgement (Dly_ACK). The type of acknowledgement is indicated by setting an acknowledgment policy field in a broadcast and multicast addressed frame upon transmission.

A transmitted frame with an acknowledgement policy field set to indicate no acknowledgment (no-ACK) is not acknowledged by the receiver. The transmitter assumes that the transmitted frame is successful for all its local management entities and proceeds to the next frame scheduled for transmission.

A transmitted frame with an acknowledgement policy field set to indicate immediate acknowledgment (Imm-ACK) is acknowledged by the receiver upon receipt. The receiver may acknowledge receipt of the transmitted frame by transmitting an acknowledgment frame back to the transmitter indicating that the transmitted frame was received.

A transmitted frame with an acknowledgement policy field set to indicate delayed acknowledgment (Dly-ACK) is acknowledged by the receiver when requested by the transmitter. The receiver may acknowledge receipt of one or more transmitted frames concurrently by transmitting an acknowledgment frame back to the transmitter indicating that those transmitted frames were received. A delayed acknowledgment schedule (e.g., number of frames between acknowledgments) may be set up during negotiations between the transmitter and receiver. If an acknowledgment frame is not received on schedule, or when requested, the last data frame of the burst may be repeated until an acknowledgement is received. The transmitter may send an empty data frame that was not in the original burst, as an alternative to resending the last data frame, as long as the total number of frames, including the empty one, does not exceed a maximum number of frames. The transmitter may not start or resume burst transmissions until an acknowledgement frame is received. The delayed acknowledgement (Dly-ACK) policy is designed to reduce acknowledgement times for burst transmission.

Figure 2:
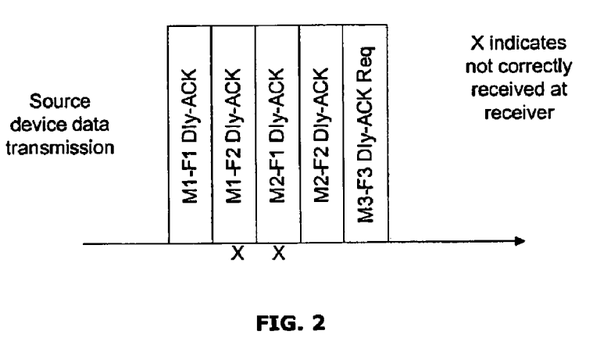
FIG. 2 is a timing diagram depicting an acknowledgment and retransmission example for use in describing an aspect of the present invention.

FIG. 2 is an exemplary timing diagram illustrating implementation of the delayed acknowledgment (Dly-ACK) policy. In FIG. 2, M stands for MAC Service Data Unit (MSDU) number and F for Fragment (or frame). Mm-Ff represents Fragment f of MSDUm. When an acknowledgment is expected, but not received during a specified time, the transmitter retransmits the frame (or a new frame if the failed frame's retransmission limit has been met) after the end of the specified time. Because the transmitter sending the data frame may not correctly receive an acknowledgement, duplicate frames may be sent even though the intended recipient has already received and acknowledged the frame. Retransmitted frames can be assembled in the same burst with other originally transmitted frames in a known manner.

Figure 3:
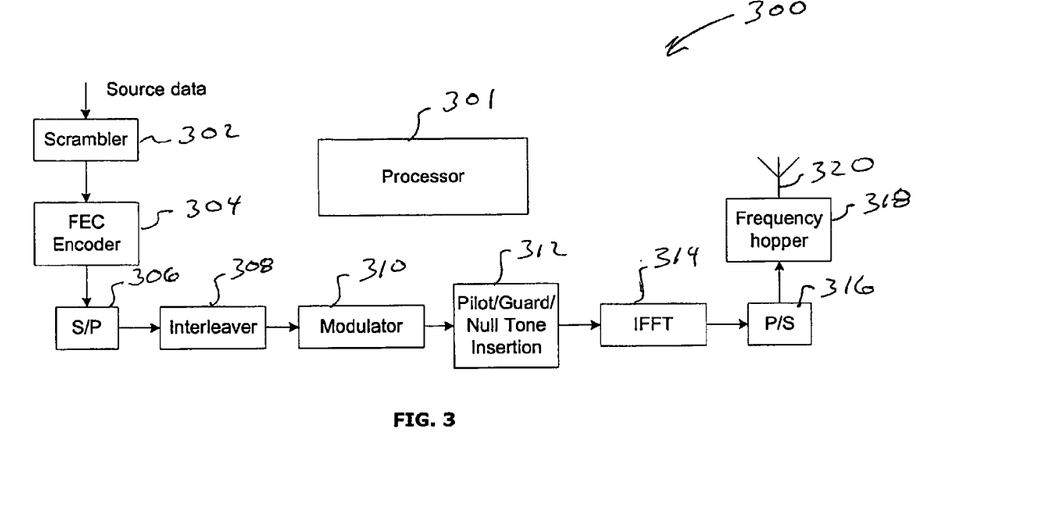
FIG. 3 is a block diagram of an exemplary transmitter in accordance with an aspect of the present invention.

FIG. 3 depicts a transmitter 300 of a wireless electronic device (herein wireless device), which forms part of a physical layer for the wireless device. The illustrated transmitter 300 includes a scrambler 302, an FEC encoder 304, a serial-to-parallel (S/P) converter 306, an interleaver 308, a modulator 310, a pilot/guard/null tone inserter 312, an inverse fast Fourier transform (IFFT) 314, a parallel-to-serial (P/S) converter 316, a frequency hopper 318, and an antenna 320. All of these component are controlled by a processor 301. For the sake of clarity, connections between the processor 301 and the elements of the transmitter 300 are not shown in FIG. 3. Suitable components for use within the transmitter 300 will be understood by one of skill in the art from the description herein.

The scrambler 102 scrambles the source data. In an exemplary embodiment, the scrambler 102 uses a 15-bit Linear Feedback Shift Register (LFSR) to generate a pseudo random binary sequence (PRBS). The scrambler may be initialized with one of four seeds per frame. The seed identifier may be contained in a physical layer header (PHY header) attached to messages for transmission over the network. The 15-bit seed value chosen corresponds to the seed identifier value, which may be set to 00 when the PHY layer is initialized and incremented using a 2-bit rollover counter for each frame that is sent by the PHY layer, i.e., the seeds may be chosen incrementally and circularly.

The FEC encoder 304 introduces error correction to the source data. The S/P converter 306 coverts the error corrected source data from serial to parallel. Suitable techniques for FEC encoding and S/P conversion will be understood by one of skill in the art from the description herein.

The interleaver 308 rearranges the data to separate consecutive bits of data. In an exemplary embodiment, a different interleaver pattern is used for the transmission of a frame and each subsequent retransmission of that frame. The interleaving pattern is a function of the number of retransmissions and may be predefined.

Table 1 sets forth an example illustrating two interleaving patterns on two different transmissions. Data bits are read in sequential order, i.e., 1, 2, 3, . . . , 198, 199, 200. In a first interleaving pattern (Interleaving I), data bits are read out in the following order: 1, 51, 101, 151, 2, 52, 102, 152, . . . , 49, 99, 149, 199, 50, 100, 150, 200. In a second interleaving pattern (Interleaving II), data bits are read out in the following order: 1, 41, 81, 121, 161, 2, 42, 82, 122, 152, . . . , 39, 79, 119, 159, 199, 40, 80, 120, 160, 200.

TABLE 1

Interleaving Patterns

| Interleaving I | | | | Interleaving II | | | | |
|---|---|---|---|---|---|---|---|---|
| 1 | 51 | 101 | 151 | 1 | 41 | 81 | 121 | 161 |
| 2 | 52 | 102 | 152 | 2 | 42 | 82 | 122 | 162 |
| 3 | 53 | 103 | 153 | 3 | 43 | 83 | 123 | 163 |
| . | . | . | . | . | . | . | . | . |
| . | . | . | . | . | . | . | . | . |
| . | . | . | . | . | . | . | . | . |
| 48 | 98 | 148 | 198 | 38 | 78 | 118 | 158 | 198 |
| 49 | 99 | 149 | 199 | 39 | 79 | 119 | 159 | 199 |
| 50 | 100 | 150 | 200 | 40 | 80 | 120 | 160 | 200 |

The modulator 310 spreads symbols over multiple tones and applies OFDM modulation. In an exemplary embodiment, the modulator 310 is a dual-carrier modulator (DCM) that spreads each symbol over two tones using an operation such as shown in equation 1:

$$\begin{bmatrix} y_n \\ y_{n+50} \end{bmatrix} = \frac{1}{\sqrt{10}} \begin{bmatrix} 2 & 1 \\ 1 & -2 \end{bmatrix} \begin{bmatrix} x_{a(n)} + jx_{a(n)+50} \\ x_{a(n)+1} + jx_{a(n)+51} \end{bmatrix}, n = 0, 1, 2, \ldots, 49 \quad (1)$$

where $$a(n) = \begin{cases} 2n & n = 0, 1, 2, \ldots, 24 \\ 2n+50 & n = 25, 26, \ldots, 49 \end{cases}$$

The block of complex symbols $\{y_n\}$ is then further modulated using an OFDM modulation scheme, such as quadrature amplitude modulation (QAM) or quadrature phase shift keying (QPSK). Where a QPSK modulation is used, a four or five bit analog-to-digital converter (ADC) may offer satisfactory performance due to the simplicity of this modulation scheme. A four or five bit ADC simplifies Fourier transform implementation and facilitates the development of lower power wireless devices. In addition, QPSK modulation enables the description of channel distortion as a phase rotation on each carrier, which can be handled through the use of simple one-tap equalizers.

Table 2 illustrates a dual carrier modulation operation for modulating input bits $\{x_n\}$ to generate output symbols $\{y_n\}$. In Table 2, four bits are mapped to each symbol and each bit is mapped to two different symbol/tones. For example, bit 1 is modulated onto symbol/tone 1 and 51 along with bits 2, 51, and 52.

TABLE 2

DCM Operation

| Output (symbol) | Input (bits) | | | |
|---|---|---|---|---|
| 1 | 1 | 2 | 51 | 52 |
| 2 | 3 | 4 | 53 | 54 |
| . | . | . | . | . |
| . | . | . | . | . |
| . | . | . | . | . |
| 24 | 47 | 48 | 97 | 98 |
| 25 | 49 | 50 | 99 | 100 |
| 26 | 101 | 102 | 151 | 152 |
| 27 | 103 | 104 | 153 | 154 |
| . | . | . | . | . |
| . | . | . | . | . |
| . | . | . | . | . |
| 49 | 147 | 148 | 197 | 198 |
| 50 | 149 | 150 | 199 | 200 |
| 51 | 1 | 2 | 51 | 52 |
| 52 | 3 | 4 | 53 | 54 |
| . | . | . | . | . |
| . | . | . | . | . |
| . | . | . | . | . |
| 74 | 47 | 48 | 97 | 98 |
| 75 | 49 | 50 | 99 | 100 |
| 76 | 101 | 102 | 151 | 152 |
| 77 | 103 | 104 | 153 | 154 |
| . | . | . | . | . |
| . | . | . | . | . |
| . | . | . | . | . |
| 99 | 147 | 148 | 197 | 198 |
| 100 | 149 | 150 | 199 | 200 |

In an alternative exemplary embodiment, a multi-carrier technique is utilized where each symbol is multiplied by each element of a vector of length N elements (where N is greater than 2 and each vector element is associated with one tone) to produce N vectors. Thus, each symbol is spread over N tones. The N vectors can be transmitted simultaneously, as they are orthogonal. Thus, the data rate is not changed by the spreading operation.

An advantage of this alternative embodiment is that frequency diversity is achieved up to diversity order N. Spreading a symbol with a spreading code, however, may change the profile of the energy level for the tones. Since UWB systems have a strict emission mask to avoid interference to other existing wireless systems operating in the same spectrum, the signal level of some tones may exceed the emission mask. Reducing the transmission level of these tones reduces/eliminates orthogonolity of the code and decreasing transmission levels of all tones reduces coverage range. A minimum mean squared error (MMSE) equalizer may be used to restore orthogonality.

The pilot/guard/null tone inserter 312 inserts pilot, guard, and null tones into the data. The IFFT 314 transforms the modulated data from the frequency domain to the time domain. The P/S converter 316 converts the data from parallel to serial for transmission. The frequency hopper 318 processes the serial data for transmission from the antenna 320. The frequency hopper 318 may include a digital-to-analog converter (DAC) for converting digital data to analog for transmission. Alternatively, digital to analog conversion may be performed at other locations within the transmitter 300. Suitable techniques for pilot/guard/null tone insertion, IFFT transformation, parallel to serial conversion, and frequency hopping for use with the present invention will be understood by one of skill in the art from the description herein.

Figure 4:
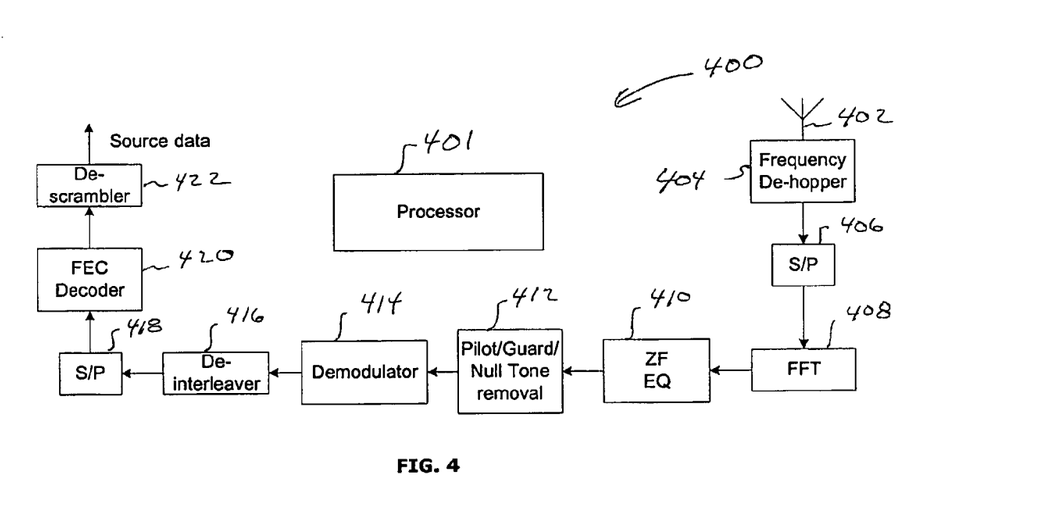
FIG. 4 is a block diagram of an exemplary receiver in accordance with an aspect of the present invention.

FIG. 4 depicts a receiver 400 of a wireless device, which forms part of a physical layer for the wireless device. The illustrated receiver 400 includes another antenna 402, a frequency de-hopper 404, a S/P converter 406, a fast Fourier transform (FFT) 408, a Zero-Forcing Equalizer (ZFEQ) 410, a pilot/guard/null tone remover 412, a demodulator 414, a de-interleaver 416, a P/S converter 418, an FEC decoder 420, and a de-scrambler 422. All of these component are controlled by a processor 401. For the sake of clarity, connections between the processor 401 and the elements of the receiver 400 are not shown in FIG. 4. Suitable components for use within the receiver 400 will be understood by one of skill in the art from the description herein.

The frequency de-hopper 404 follows the frequency hopping used by the transmitter 300 to receive a signal transmitted by the transmitter 300 (FIG. 3) via the antenna 402. The S/P converter 406 converts the received signal from serial to parallel for processing. The FFT converter 408 converts the signal from the time domain to the frequency domain. The ZFEQ 410 equalizes the signal to minimize any inter symbol interference (ISI) attributable to the modulation performed by the modulator 310 (FIG. 3) in the transmitter 300. The pilot/guard/null tone remover 412 removes pilot, guard, and null tones. The demodulator 414 reverses the modulation introduced by the modulator 310 (FIG. 3). The de-interleaver 416 reverses the interleaving introduced by the interleaver 308 (FIG. 3). The P/S converter 418 converts the signal from parallel to serial. The FEC decoder 420 decodes the signal. The de-scrambler 422 reverses the scrambling introduced by the scrambler 302 (FIG. 3). The frequency de-hopper 404 may include an analog-to-digital converter (ADC) for converting received analog signals to digital signals. Alternatively, analog to digital conversion may be performed at other locations within the receiver 400.

Figure 5:
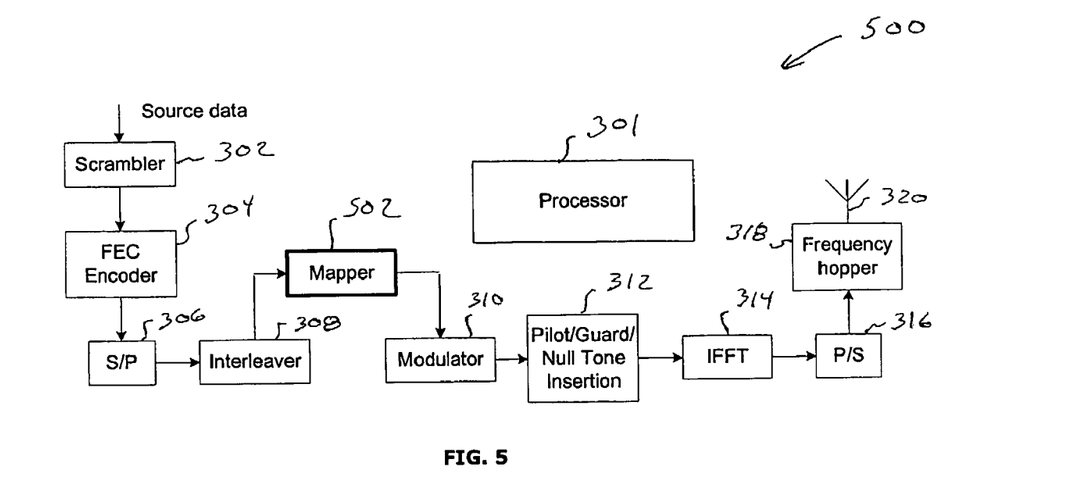
FIG. 5 is a block diagram of an alternative exemplary transmitter in accordance with an aspect of the present invention.

FIG. 5 depicts an exemplary transmitter 500. The transmitter 500 is similar to the transmitter 300 described above with reference to FIG. 3 with the exception that a mapper 502 is inserted between the interleaver 308 and the modulator 310. When positioned before the modulator 310, the mapper 502 may remap the input bits being supplied to the modulator 310. Operation of the mapper 502 is described in detail below. Component common to the two transmitters 300 and 500 are identically numbered and are not described in further detail. The mapper 502 may be integrated with the interleaver 308 with multiple interleavers 308 being employed, i.e., one for each mapping. Each time a frame is transmitted, a different mapping may be used for that frame. Transmitter and receiver mappings for a particular frame may be synchronized through the use of a retransmission number associated with that frame.

Figure 6:
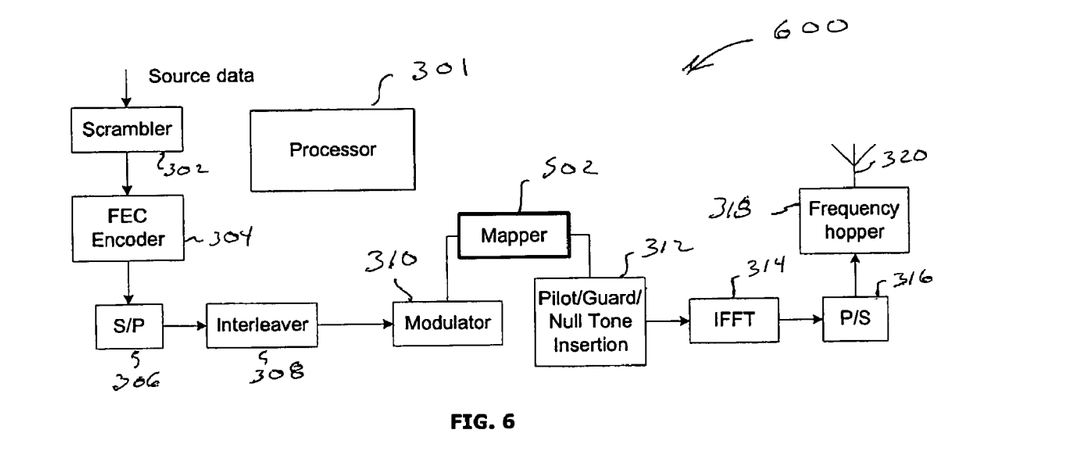
FIG. 6 is a block diagram of an alternative exemplary transmitter in accordance with an aspect of the present invention.

FIG. 6 depicts an alternative exemplary transmitter 600 that is similar to the transmitter 500 of FIG. 5 with the exception that the mapper 502 is positioned between the modulator 310 and the pilot/guard/null tone inserter 312. When positioned after the modulator 310, the mapper 502 may remap the output symbols generated by the modulator 310. Those of skill in the art will understand that the mapper 502 may be inserted within the transmitter at other positions from the description herein.

Figure 7:
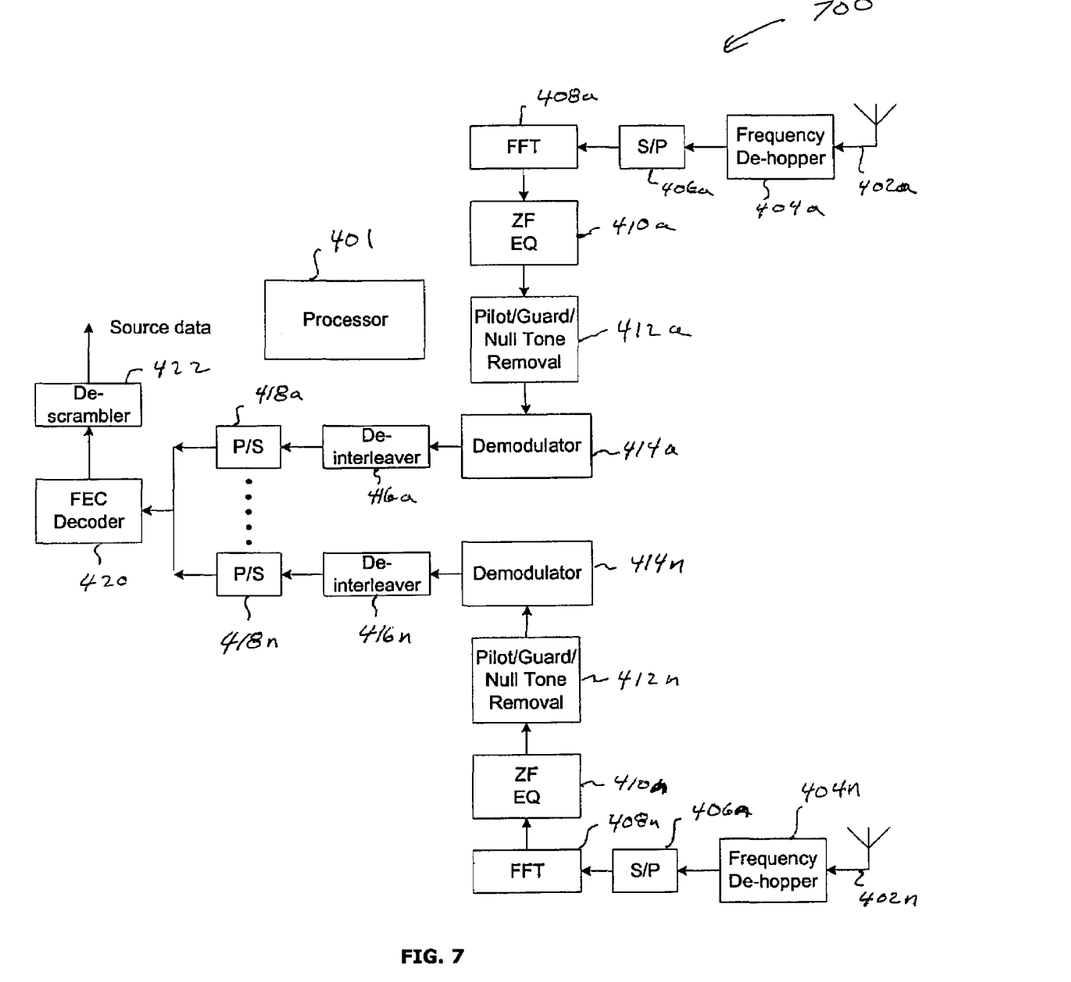
FIG. 7 is a block diagram of an alternative exemplary receiver in accordance with an aspect of the present invention.

FIG. 7 depicts an exemplary receiver 700 that is configured for use with the exemplary transmitters 500 and 600 of FIGS. 5 and 6, respectively. The exemplary receiver 700 is similar to the receiver 400 of FIG. 4 with the exception that one or more of the components within the receiver are repeated to handle different mappings introduced by the mapper 502 (FIG. 5). Each group of repeated components is designated with a small letter designation from a-n. The group selected for processing a particular frame may be indicated through the use of a retransmission number associated with that frame.

Figure 8:
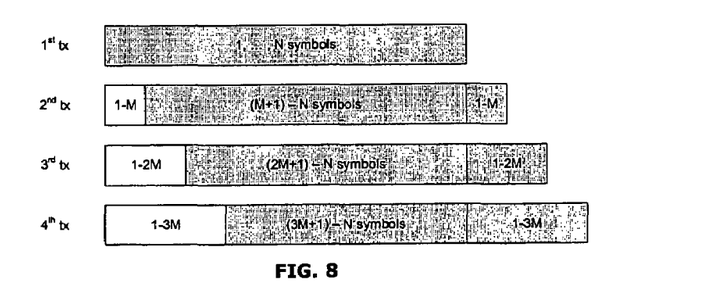
FIG. 8 is a timing diagram depicting a symbol retransmission scheme in accordance with an aspect of the present invention.

The mapper 502 (FIGS. 5 and 6) may map a symbol $\{y_n\}$ to $\{z_n\}$ in accordance with equation 2:

$$z_n = \begin{cases} y_n & \text{transmission} \\ y_{n+iM(\text{mod}(N))} & \text{retransmission} \end{cases} n = 1, 2, \ldots, N \quad (2)$$

where i is the number of retransmission, M is the offset of a start symbol and N is the total number of symbols in a frame. FIG. 8 illustrates this mapping scheme for a transmission and three retransmissions. FIG. 8 shows that for a total of four transmissions, each symbol $\{y_n\}$ is mapped onto four different tones for transmission. Therefore, without increasing signal processing complexity, a spreading gain of four is achieved.

In the above embodiments, spreading does not take channel characteristics into consideration. Thus, symbols on tones with deep fade may be retransmitted on tones with deep fade again. In an alternative exemplary embodiment, the receiver notifies the transmitter of the best and worst tones. The offset of a next retransmission of the frame is then selected such that the symbols on the worst tone in a previous transmission are mapped to the best tone in a subsequent transmission. In an exemplary embodiment, the receiver records an average level of each symbol. The offset of a next retransmission of the frame is then selected to map the symbols with the lowest reception level onto the best tone in the next retransmission.

The mapping described above is relatively easy to implement and enables easy synchronization between transmitters and receivers. Symbols experiencing the deepest fade, however, may not be mapped to tones with the least fade in the next retransmission. After retransmissions, some symbols may still experience less energy reception than other symbols at the receiver. The energy from multiple transmission of a symbol can be combined to improve the signal to noise ratio of the symbol.

The goal of synchronization in this alternative exemplary embodiment is for receivers to inform transmitters of channel conditions and suggest symbol to sub-carrier mapping for the next retransmission. To simplify synchronization implementation, tones can be divided into a few categories based on the energy level of received signals on the tones. Only those symbols falling into the lowest levels may be specified for remapping to other tones. Other unspecified symbols may be mapped in order, e.g., sequentially, to the remaining tones.

Tone remapping may be achieved by two bit-mapped tables representing current symbol-to-tone mapping and next symbol-to-tone mapping, shown in Table 3. In Table 3, a '1' in the second row represents the tones in the category of lowest signal reception level and a '1' in the third row represents the tones for use in the next transmission of the above symbols. For example, symbols on tones 2, 4, and 5 in the current transmission (shown in the second row) may be retransmitted on tones 3, 6, and 8 (shown in the third row). Other unspecified symbols in the current transmission are arranged in order onto those unspecified tones in the next retransmission, i.e., symbols 1, 3, 6, 7, and 8 may be sent on tones 1, 2, 4, 5, and 7.

TABLE 3

Symbol-to-Tone Mapping

| | Index of tones | | | | | | | |
|---|---|---|---|---|---|---|---|---|
| | 1 | 2 | 3 | 4 | 5 | 6 | 7 | 8 |
| Tone usage of current Tx | 0 | 1 | 0 | 1 | 1 | 0 | 0 | 0 |
| Tone usage of next Tx | 0 | 0 | 1 | 0 | 0 | 1 | 0 | 1 |

The 128 tones utilize 128 bits, or 16 bytes, for a current symbol-to-tone mapping and 128 bits, or 16 bytes, for a next symbol-to-tone mapping. Thus, 32 total bytes are used. The receiver may send notification of the reception after a burst of frames. This notification may include the mapping bytes.

The various aspects of the present invention provide a mechanism to utilize packet retransmission with symbol spreading to achieve further spreading without increasing implementation complexity. The basic concept is to utilize different mapping of bits to tones in transmissions and subsequent retransmissions so that each bit can be transmitted on different tones in each transmission to increase spreading in frequency. The scheme can be used in multi-carrier wireless communication systems to improve frequency diversity by improving symbol/bit spreading.

Figure 9:
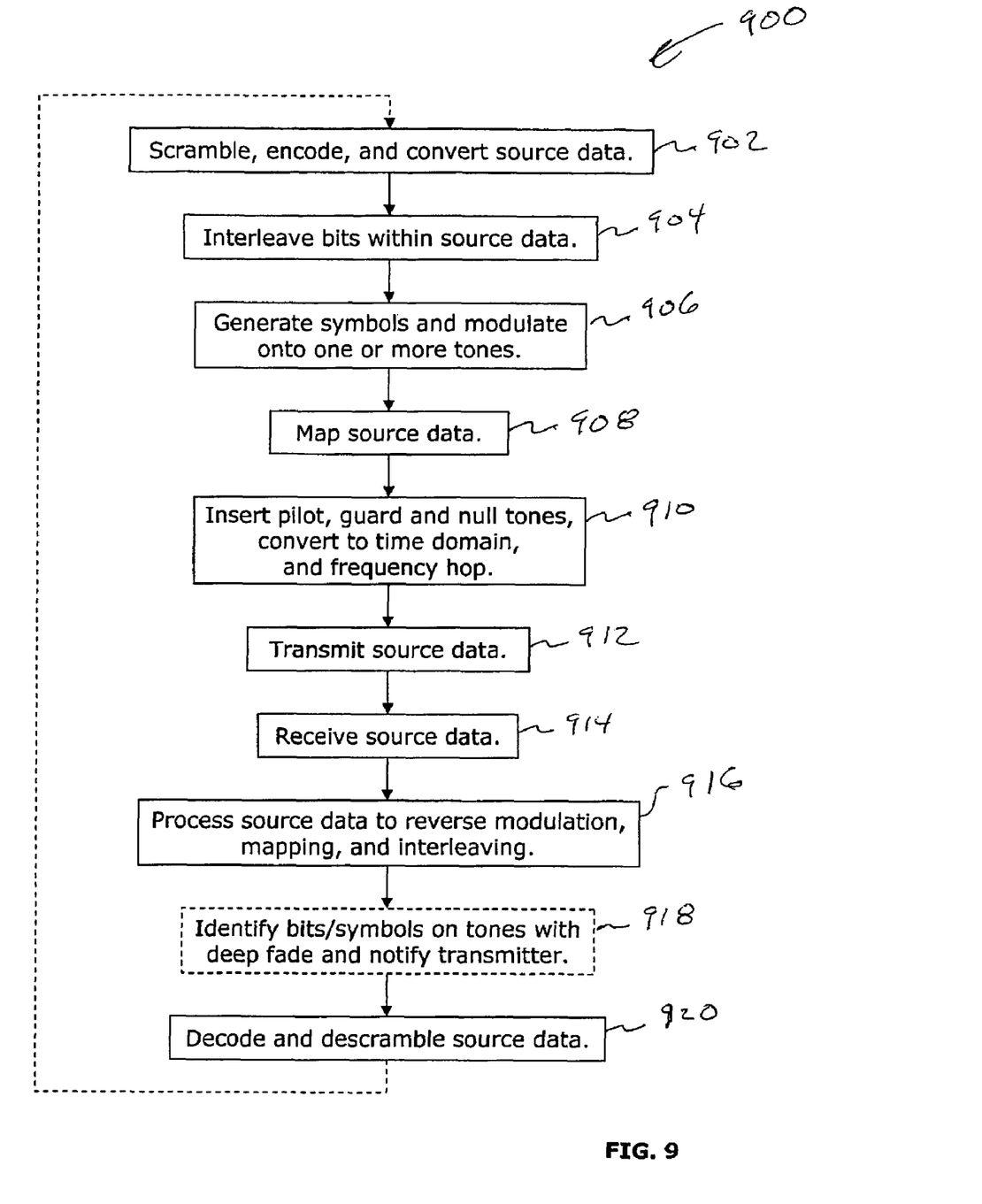
FIG. 9 is a flow chart of exemplary transmission system steps in accordance with an aspect of the present invention.

FIG. 9 depicts a flow chart 900 of exemplary steps for transmitting a frame of source data over a plurality of tones/frequencies in accordance with an aspect of the present invention. The steps will be described with reference to the transmitters 500/600 depicted in FIGS. 5 and 6 and the receiver 700 depicted in FIG. 7. At block 902, a scrambler 302 scrambles the source data, a FEC encoder 304 introduces forward error correction to the source data, and an S/P converter 306 converts the source data from serial to parallel.

At block 904, an interleaver 308 interleaves the bits within the source data. In an exemplary embodiment, the interleaver 308 interleaves the bits within the frame of source data using a first interleave pattern for source data being transmitted for the first time and interleaves the bits within the frame of source data using a second interleave pattern for source data being retransmitted.

At block 906, a modulator 310 generates symbols from the bits within the frame of source data and modulates each symbol onto at least two of the tones such that each bit is modulated onto at least two different tones. In an exemplary embodiment, the modulator 310 multiples each symbol by each element of a vector having three or more elements, wherein each element is associated with a different tone.

At block 908, a mapper 502 maps the frame of source data for transmission using a first mapping and maps the frame of source data for retransmission using a second mapping that is different from the first mapping to increase frequency diversity. Subsequent retransmissions of the source data may be mapped using mappings that are different from the first and second mapping (e.g., a second retransmission may be mapped using a third mapping that is different from the first and second mappings) to further increase frequency diversity. The mappings for the retransmitted frames may be based on feedback received from the receiver 700. For example, the receiver may notify the transmitter 500/600 of bits/symbols on tones/frequencies experiencing deep fade in a transmission or retransmission. The processor 301 within the transmitter 500/600 may then select a mapping for a first retransmission or subsequent retransmission such that the bits/symbols are mapped to tones/frequencies that are not experiencing deep fade.

In an exemplary embodiment, the mapper 502 is positioned after the modulator 310 such as depicted in FIG. 6. In accordance with this embodiment, the mapper 502 maps that source data on a symbol-by-symbol basis. In an alternative exemplary embodiment, the mapper 502 is positioned before the modulator 310 such as depicted in FIG. 5. In accordance with this embodiment, since the bits have not yet been converted to symbols by the modulator 310, the mapper 502 maps the source data on a bit-by-bit basis. Also, in accordance with this embodiment, the step set forth in block 908 would be performed between the steps set forth in blocks 904 and 906.

At block 910, the pilot/guard/null tone inserter 312 inserts pilot, guard, and null tones, the IFFT 314 converts the source data from the frequency domain to the time domain, a P/S converter 316 converts the source data from parallel to serial, and a frequency hopper 318 processes the serial data for transmission. At block 912, the transmitter 500/600 transmits the source data from the antenna 320.

At block 914, the receiver 700 receives the transmitted source data at one or more other antennas 402. At block 916, the receiver 700 processes the received source data to reverse the modulation, mapping, and interleaving introduced by the transmitter 500/600. In an exemplary embodiment, the receiver 700 includes a frequency de-hopper 404, a S/P converter 406, a FFT 408, a ZFEQ 410, a pilot/guard/null tone remover 412, a demodulator 414, a de-interleaver 416, and a P/S 418 corresponding to each mapping used by the transmitter 500/600 to map the source data.

At block 918, the processor 401 within the receiver optionally identifies bits/symbols on tones with deep fade and sends at notification to the transmitter (e.g., during acknowledgement) notifying the transmitter of the tones with deep fade so that the transmitter may remap the bits/symbols to tones without deep fade.

At block 920, the FEC decoder 420 performs error correction and a descrambler 422 descrambles the source data to recover the original source data. In an exemplary embodiment, the source data from multiple transmissions is combined to improve the signal to noise ratio of the transmitted source data. The process is then repeated for one or more retransmissions as indicated by dashed line 950.

Although the invention has been described in terms of interleavers 308, de-interleavers 416, mappers 502, modulators 310, and demodulators 414, the invention may be implemented in software on a computer (not shown). In this embodiment, one or more of the functions of the various components may be implemented in software that controls the computer. This software may be embodied in a computer readable carrier, for example, a magnetic or optical disk, a memory-card or an audio frequency, radio-frequency, or optical carrier wave.

Further, although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A transmission method for use in a multi-band OFDM wideband system, the method comprising the steps of:
    interleaving bits within a frame of source data using a first interleave pattern prior to transmitting;
    mapping symbols within the frame of source data to a first plurality of tones using a first mapping;
    transmitting the frame of source data mapped using the first mapping;
    interleaving the bits within the frame of source data using a second interleave pattern prior to retransmitting;
    mapping the symbols within the frame of source data to a second plurality of tones using a second mapping; and
    retransmitting the frame of source data using the second mapping;
    wherein frequency spreading for the frame of source data is improved through the use of the first and second mappings;
    and wherein the mapping steps are performed in accordance with the operation:

$$z_n = \begin{cases} y_n & \text{transmission} \\ y_{n+iM(\bmod(N))} & \text{retransmission} \end{cases} \quad n = 1, 2, \ldots, N$$

wherein i is the number of retransmission, M is the offset of a start symbol, N is the total number of symbols in the frame, $y_n$ are the symbols and $z_n$ are the first and second plurality of the tones to which the symbols are mapped.

2. The method of claim 1, further comprising the steps of:
    mapping a frame of source data using a third mapping; and
    retransmitting the frame of source data mapped using the third mapping;
    wherein frequency spreading for the frame of source data is further improved through the use of the third mapping.

3. The method of claim 1, wherein the frame includes bits, the frame is transmitted over a plurality of tones, and the method further comprises the steps of:
    generating symbols from the bits within the frame, wherein each symbol includes two or more bits; and
    modulating each symbol onto at least two of the plurality of tones such that each bit is modulated onto at least two different tones prior to transmitting and prior to retransmitting.

4. The method of claim 3, wherein the modulating step comprises the step of:
    spreading each symbol over two tones using the operation:

$$\begin{bmatrix} y_n \\ y_{n+50} \end{bmatrix} = \frac{1}{\sqrt{10}} \begin{bmatrix} 2 & 1 \\ 1 & -2 \end{bmatrix} \begin{bmatrix} x_{a(n)} + jx_{a(n)+50} \\ x_{a(n)+1} + jx_{a(n)+51} \end{bmatrix}, n = 0, 1, 2, \ldots, 49$$

wherein $x_n$ equals input bits, $y_n$ equals output bits, and $$a(n) = \begin{cases} 2n & n = 0, 1, 2, \ldots, 24 \\ 2n+50 & n = 25, 26, \ldots, 49 \end{cases}.$$

5. The method of claim 3, wherein the modulating step comprises the step of: multiplying each symbol by each element of a vector having three or more elements, wherein each element is associated with a different tone.

6. The method of claim 3, wherein the mapping steps are performed on a bit-by-bit basis prior to the modulating step.

7. The method of claim 3, wherein the mapping steps are performed on a symbol-by-symbol basis after the modulating step.

8. The method of claim 1, wherein the frame includes symbols, the symbols are transmitted on tones, and wherein the method further comprises the steps of:

receiving the transmitted frame of source data mapped using the first mapping;

identifying symbols on any tones with deep fade within the received frame; and notifying the transmitter of the identified tones with deep fades;

wherein the second mapping maps the identified symbols on tones with deep fade to tones without deep fade.

9. A transmission apparatus, the transmission apparatus including a transmitter for transmitting a frame of source data including bits over a plurality of tones, the transmitter of the transmission apparatus comprising:

an interleaver configured to interleave the bits within the frame of source data using a first interleave pattern prior to transmission and using a second interleave pattern prior to retransmission;

a mapper coupled to the interleaver, the mapper configured to map the frame of source data for transmission using a first mapping and to map the frame of source data for retransmission using a second mapping; and a modulator coupled to the mapper, the modulator configured to generate a plurality of symbols from the bits of the source data and to modulate each symbol onto at least one tone;

wherein the mapper maps the frame of source data in accordance with the operation:

$$z_n = \begin{cases} y_n & \text{transmission} \\ y_{n+iM(\text{mod}(N))} & \text{retransmission} \end{cases} n = 1, 2, \ldots, N$$

wherein i is the number of retransmission, M is the offset of a start symbol, N is the total number of symbols in the frame, $y_n$ are the plurality of symbols, and $z_n$ are the plurality of tones.

10. The apparatus of claim 9, wherein the modulator modulates each symbol onto at least two of the plurality of tones such that each bit is modulated onto at least two different tones.

11. The apparatus of claim 9, wherein the mapper is positioned prior to the modulator such that the mapper maps the source data on a bit-by-bit basis.

12. The apparatus of claim 9, wherein the mapper is positioned after the modulator such that the mapper maps the source data on a symbol-by-symbol basis.

13. The apparatus of claim 9, the transmission apparatus further including a receiver that receives the frame of source data, the receiver of the transmission apparatus comprising:

a first demodulator and a first de-interleaver for reversing the modulation introduced by the modulator and for reversing the interleaving introduced by the interleaver, respectively, for the frame of source data mapped using the first mapping; and a second demodulator and a second de-interleaver for reversing the modulation introduced by the modulator and for reversing the interleaving introduced by the interleaver, respectively, for the frame of source data mapped using the second mapping.

14. The apparatus of claim 13, the receiver further comprising:

a processor configured to identify received symbols on tones with deep fade and to generate an acknowledgement signal notifying the transmitter of the tones with deep fade;

wherein the transmitter maps the symbols transmitted on tones with deep fade to tones without deep fade for retransmission.

15. A non-transitory computer readable medium including computer program instructions, the computer program instructions causing a computer to perform a transmission method for use in a multi-band OFDM wideband system, the method comprising the steps of:

interleaving bits within a frame of source data using a first interleave pattern prior to transmitting;

mapping symbols within the frame of source data to a first plurality of tones using a first mapping;

transmitting the frame of source data mapped using the first mapping;

interleaving the bits within the frame of source data using a second interleave pattern prior to retransmitting;

mapping the symbols within the frame of source data to a second plurality of tones using a second mapping; and retransmitting the frame of source data using the second mapping;

wherein frequency spreading for the frame of source data is improved through the use of the first and second mappings and wherein the mapping steps are performed in accordance with the operation:

$$z_n = \begin{cases} y_n & \text{transmission} \\ y_{n+iM(\text{mod}(N))} & \text{retransmission} \end{cases} n = 1, 2, \ldots, N$$

wherein i is the number of retransmission, M is the offset of a start symbol, N is the total number of symbols in the frame, $y_n$ are the symbols and $z_n$ are the first and second plurality tones to which the symbols are mapped.

16. The non-transitory computer readable medium of claim 15, wherein the frame includes symbols, the symbols are transmitted on tones, and wherein the method further comprises the steps of:

receiving the transmitted frame of source data mapped using the first mapping;

identifying symbols on any tones with deep fade within the received frame; and notifying the transmitter of the identified tones with deep fades;

wherein the second mapping maps the identified symbols on tones with deep fade to tones without deep fade.

* * * * *

UNITED STATES PATENT AND TRADEMARK OFFICE
CERTIFICATE OF CORRECTION

PATENT NO. : 8,031,785 B2  Page 1 of 1
APPLICATION NO. : 11/791872
DATED : October 4, 2011
INVENTOR(S) : Shaomin Samuel Mo and Alexander D. Gelman It is certified that error appears in the above-identified patent and that said Letters Patent is hereby corrected as shown below:

On the Title page, Item (60) is missing. It should read:

Related U.S. Application Data (60) Provisional application No. 60/631,814, filed on November 30, 2004

Signed and Sealed this
Thirteenth Day of March, 2012

David J. Kappos
*Director of the United States Patent and Trademark Office*